United States Patent
Cronk (10) Patent No.: US 10,775,020 B2
(45) Date of Patent: Sep. 15, 2020

(54) LUMINAIRE ASSEMBLY

(71) Applicant: Paul Andrew Cronk, Brookvale (AU)

(72) Inventor: Paul Andrew Cronk, Brookvale (AU)

(*) Notice: Subject to any disclaimer, the term of this patent is extended or adjusted under 35 U.S.C. 154(b) by 0 days.

(21) Appl. No.: 16/537,792

(22) Filed: Aug. 12, 2019

(65) Prior Publication Data

US 2019/0360660 A1   Nov. 28, 2019

Related U.S. Application Data

(63) Continuation of application No. 16/079,282, filed as application No. PCT/AU2017/050150 on Feb. 21, 2017, now Pat. No. 10,422,507.

(30) Foreign Application Priority Data

Feb. 25, 2016 (AU) ................. 2016900684
Aug. 5, 2016 (AU) ................. 2016903092

(51) Int. Cl.
   *F21V 7/18*   (2006.01)
   *F21S 8/06*   (2006.01)
   (Continued)

(52) U.S. Cl.
   CPC ............ *F21V 7/18* (2013.01); *A01G 7/045* (2013.01); *F21S 8/06* (2013.01); *F21S 8/061* (2013.01);
   (Continued)

(58) Field of Classification Search
   CPC .. A01G 7/045; F21S 8/06; F21S 8/061; F21V 23/026; F21V 7/005; F21V 7/0025;
   (Continued)

(56) References Cited

U.S. PATENT DOCUMENTS

| 4,837,669 A | 6/1989 | Tharp |
| 5,025,356 A * | 6/1991 | Gawad ................. A01G 7/045 |
| | | 362/221 |

(Continued)

FOREIGN PATENT DOCUMENTS

| EP | 0959296 A2 | 11/1999 |
| GB | 2376063 A | 12/2002 |
| WO | WO 1996/037732 A | 11/1996 |

OTHER PUBLICATIONS

Gavita Pro 750e / 1000e manual (EU version English), May 26, 2015, Gavita [Retrieved from internet on Apr. 3, 2017] < URL: http://www.gavita-holland.com/index.php/documentation-a-downloads/proline/item/manual-pro-750e-1000e-se-eu.htm >.

(Continued)

*Primary Examiner* — Peggy A Neils
(74) *Attorney, Agent, or Firm* — Polsinelli PC (57) ABSTRACT

A luminaire (61) is disclosed with a close coupled ballast (62) having a support arm (66) from which is suspended or hung a reflector, and preferably a variable focus reflector (41), having either a single ended lamp (3) or double ended lamp (23). The luminaire (61) is supported from a greenhouse rafter (9) by filaments (10, 11) which are connected one to the ballast (62) and the other to the free end of the support arm (66). In one embodiment the arm (66) is connected to a rigid side plate (64) which is mounted on the ballast (62). In another embodiment the arm (66) is connected to a side plate (164) which is hinged. The arrangement enables flimsy reflectors (41) to be close coupled with electronic ballasts in a way which minimises Radio Frequency Interference (RFI).

11 Claims, 8 Drawing Sheets

(51) Int. Cl.
*A01G 7/04* (2006.01)
*F21V 23/02* (2006.01)
*F21V 17/10* (2006.01)
*F21V 17/08* (2006.01)
*F21V 7/00* (2006.01)
*F21V 7/04* (2006.01)
*F21Y 103/00* (2016.01)
*F21V 7/16* (2006.01)
*F21V 7/24* (2018.01)

(52) U.S. Cl.
CPC ............... *F21V 7/005* (2013.01); *F21V 7/04* (2013.01); *F21V 17/08* (2013.01); *F21V 17/102* (2013.01); *F21V 23/026* (2013.01); *F21V 7/16* (2013.01); *F21V 7/24* (2018.02); *F21Y 2103/00* (2013.01); *Y02P 60/146* (2015.11)

(58) Field of Classification Search
CPC ..... F21V 7/04; F21V 7/16; F21V 7/09; F21V 17/08; F21V 23/008; F21Y 2103/00; Y02P 60/146
See application file for complete search history.

(56) References Cited

U.S. PATENT DOCUMENTS

| | | |
|---|---|---|
| 5,720,546 A | 2/1998 | Correll, Jr. et al. |
| 6,152,583 A | 11/2000 | Langner |
| 6,290,375 B1 | 9/2001 | Levasseur |
| 6,585,396 B1 | 7/2003 | Verfuerth |
| 7,156,539 B2 | 1/2007 | Cronk |
| 9,363,953 B2 | 6/2016 | Wardenburg |
| 2001/0004320 A1 | 6/2001 | Wood |
| 2006/0109660 A1 | 5/2006 | Wolf |
| 2010/0224404 A1 | 9/2010 | Rippel |
| 2016/0374273 A1* | 12/2016 | Quazi .................... A01G 7/045 362/235 |

OTHER PUBLICATIONS

Written Opinion of the International Preliminary Examining Authority dated Dec. 7, 2017 in PCT/AU2017/050150.

* cited by examiner

LUMINAIRE ASSEMBLY

CROSS REFERENCE TO RELATED APPLICATIONS

This application is a Continuation of U.S. application Ser. No. 16/079,282, now U.S. Pat. No. 10,422,507, filed Feb. 21, 2017, as the National Phase of Application No. PCT/AU2017/050150 filed Feb. 21, 2017, which in turn claims priority to Application No. 2016900684 filed in Australia on Feb. 25, 2016 and Application No. 2016903092 filed in Australia on Aug. 5, 2016 under 35 U.S.C. § 119 and 35 U.S.C. § 365. The entire contents of each application are hereby incorporated by reference.

FIELD OF THE INVENTION

The present invention relates to luminaires and, in particular, to a luminaire assembly which finds the particular application in greenhouses and like installations having an overhead support system.

BACKGROUND ART

Horticultural luminaires are widely used in greenhouse installations for growing flowers, tomatoes and other horticultural products. Usually the luminaires are suspended by a pair of wires from an overhead support such as a rafter, or other bearer, so that the luminaire is substantially horizontal. As a consequence, the light produced by the luminaire shines downwardly on the plants below.

The lamps used in such horticultural applications are high intensity discharge (HID) lamps such as high pressure sodium lamps which have a negative resistance characteristic. As a consequence, a ballast is required to operate the lamp and control the lamp current. Traditionally such ballasts have been inductors and the lamps have been operated at AC mains frequency. As a result, the ballast can be mounted in any convenient position (often approximately at waist height) and is connected to the reflector and lamp by means of a cable having a length in the vicinity of 2-3 m (6-9 ft).

However, in recent times, electronic ballasts have become increasingly popular. Such ballasts operate at high frequencies and are therefore liable to cause radio frequency interference (RFI). In order to reduce the possibility of RFI it is desirable to shorten the electrical connection between the ballast and the lamp. As a consequence, it is desirable to mount the ballast immediately adjacent the lamp. Luminaires where the ballast is immediately adjacent the lamp are said to be close coupled.

Genesis of the Invention

The genesis of the present invention is a desire to provide a close coupled luminaire assembly having a lamp and a reflector arrangement, previously mounted at a position remote from the ballast. In this way such a lamp and reflector arrangement can be converted into a close coupled luminaire assembly.

SUMMARY OF THE INVENTION

In accordance with a first aspect of the present invention there is disclosed a close coupled luminaire assembly comprising a ballast, a focus reflector fabricated from sheet material and at least one lamp socket, each lamp socket being connected to the reflector, the ballast having a first axis and a first mounting attachment to permit the ballast to be suspended by a first filament from an overhead support with said ballast first axis being substantially vertical and the ballast being closely spaced to said one lamp socket wherein the assembly includes a reflector support arm which is connected to said ballast and extends substantially perpendicular to said ballast first axis, a distal end of said reflector support arm has a second mounting attachment to permit said distal end to be suspended by a second filament from an overhead support with said ballast support arm being substantially horizontal, and said reflector and lamp socket(s) hang loosely from said reflector support arm without any rigid mechanical interconnection between said support arm and said reflector.

In accordance with a second aspect of the present invention there is disclosed a method of mounting a reflector of a luminaire closely adjacent a ballast to form a close coupled luminaire assembly, said reflector being fabricated from sheet material, including a spaced apart pair of inverted generally U-shaped brackets, at least one lamp socket being connected to said reflector, and said ballast having a first axis, said method comprising the steps of:

(i) connecting a reflector support arm to said ballast so as to be substantially perpendicular to said ballast first axis, said arm being at least as long as the spacing between said brackets;

(ii) providing a mounting attachment at, or adjacent the distal end of said arm;

(iii) passing said arm through both of said brackets to thereby locate said ballast adjacent said reflector without any rigid mechanical interconnection between said support arm and said reflector; and (iv) supporting said ballast and said mounting attachment from an overhead support whereby said reflector hangs loosely from said support arm.

In accordance with another aspect of the present invention there is disclosed a reflector support arm to position a reflector adjacent to a ballast, said arm having a longitudinal axis, two ends, a mounting attachment at a first, distal, end of said arm, and a connection plate at a second, proximal, end of said arm and no means to make a rigid mechanical interconnection between said reflector support arm and said reflector.

Preferably, the reflector is an adjustable focus reflector, however, this is not necessary and the reflector can be of fixed focus, for example.

BRIEF DESCRIPTION OF THE DRAWINGS

Two embodiments of the present invention will now be described, by way of example only, with reference to the accompanying drawings in which.

DETAILED DESCRIPTION

Figure 1:
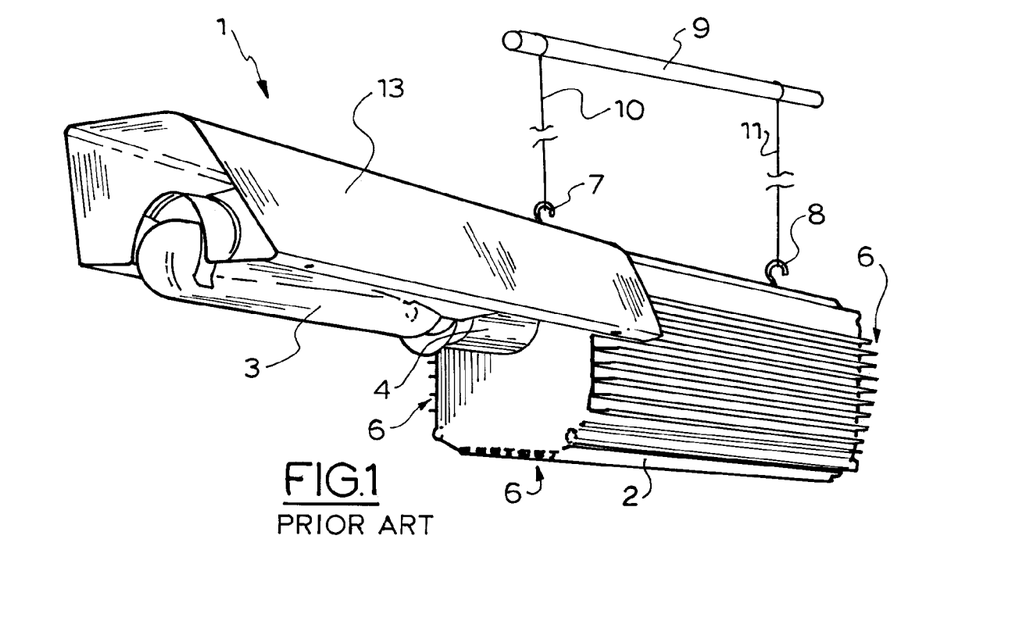
FIG. 1 is a perspective view of a first prior art close coupled luminaire assembly.

FIG. 1 illustrates a prior art close coupled luminaire assembly 1 having a ballast 2 and a single ended lamp 3. The lamp 3 screws into a socket 4 which is mounted on the ballast 2. The ballast 2 is provided with a multiplicity of fins 6 which operate as a heat sink. The ballast 2 is supported by two mounting hooks 7, 8 which enable the luminaire assembly 1 to be suspended in a substantially horizontal configuration from an overhead support 9 by means of first and second filaments 10, 11. Finally, a fixed reflector 13 is connected to the ballast 2 so as to direct downwardly light emitted from the single ended lamp 3.

Figure 2:
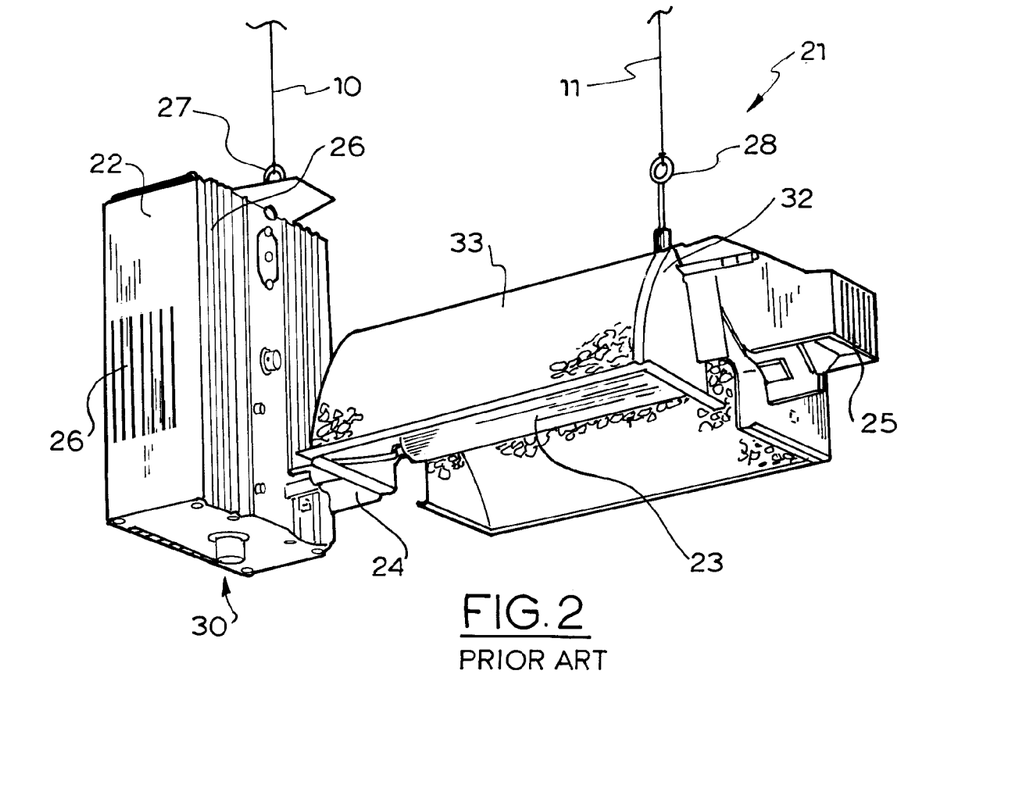
FIG. 2 is a perspective view of a second prior art close coupled luminaire assembly.

FIG. 2 illustrates a second close coupled luminaire assembly 21 which has a ballast 22 and a double ended lamp 23. The double ended lamp 23 extends between sockets 24, 25. The socket 24 is connected to the ballast 22 in such a way that the lamp 23 is horizontal but the longitudinal axis of the ballast 22 is vertical. This has the advantage of permitting easy access to various controls 30 on the lowermost face of the ballast 22.

Extending over the double ended lamp 23 is a fixed reflector 33 which is connected to a saddle 32 which has an inverted U-shaped configuration and which extends from the ballast 22 to the socket 25. The ballast 22 has a mounting eye 27 and the saddle 32 has a mounting eye 28. These enable first and second filaments 10, 11 (as for FIG. 1) to be used to support the luminaire assembly 21. The saddle 32 is interconnected with, and supports, both sockets 24, 25 and the reflector 33. The reflector 33 is fabricated from dimpled aluminium sheet and has fixed end walls as illustrated in FIG. 2.

It will be seen that one of the characteristics of the prior art close coupled luminaires is that the reflector, or possibly a housing for a reflector, is rigidly connected to the ballast (either directly or via a clamping action with a lamp socket such as socket 4). As a consequence, such prior art close coupled luminaires do not provide for any substantial reflector movement or permit the optical advantages of an adjustable focus.

Figure 3:
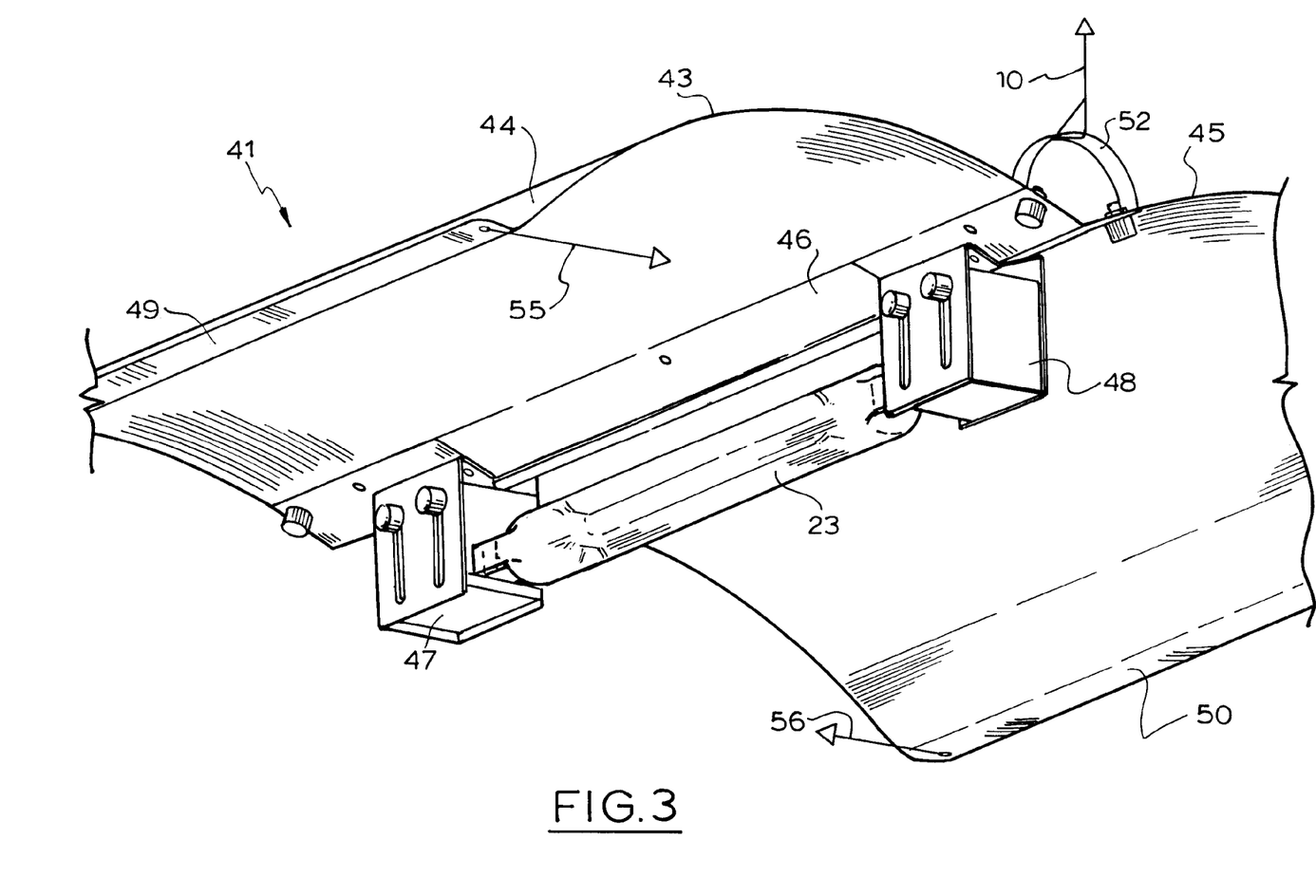
FIG. 3 is a partial perspective view of a reflector and double ended lamp arrangement which has hitherto not been close coupled to a ballast.

Turning now to FIG. 3, illustrated therein is the luminaire assembly of International Patent Application No. PCT/AU2015/050491 (which is unpublished as at the priority date of the present application) and was subsequently published as WO2016/033644. The luminaire assembly 41 has an M-shaped reflector 43 formed from two sheets 44, 45 of thin flexible and pliant reflecting material such as sheet aluminium or sheet steel. The sheets 44, 45 overlap to form a spine 46 on which two lamp sockets 47, 48 are mounted each supported by corresponding brackets 147,148 which are separately formed. A double ended lamp 23 extends between the sockets 47, 48.

In known fashion the sheets 44, 45 can be subjected to variable tensions and thereby vary the focus of the reflector 43. The tension is provided by means of a pair of chains or wires 55, 56 which are schematically illustrated. The chains or wires 55,56 extend from opposite edges 49, 50 of the sheets 44, 45 respectively. The reflector 43, sockets 47, 48 and lamp 23 are all supported by a pair of U-shaped brackets 52, 53 only one of which 52 is illustrated in FIG. 3. As in the prior art, the brackets 52, 53 are directly connected to an overhead support by means of a corresponding filament 10.

Because of the light weight, relatively flimsy, construction of the luminaire 41, there is no way to directly interconnect the flimsy reflector 43 and a heavy ballast so as to form a close coupled luminaire assembly.

Figure 4:
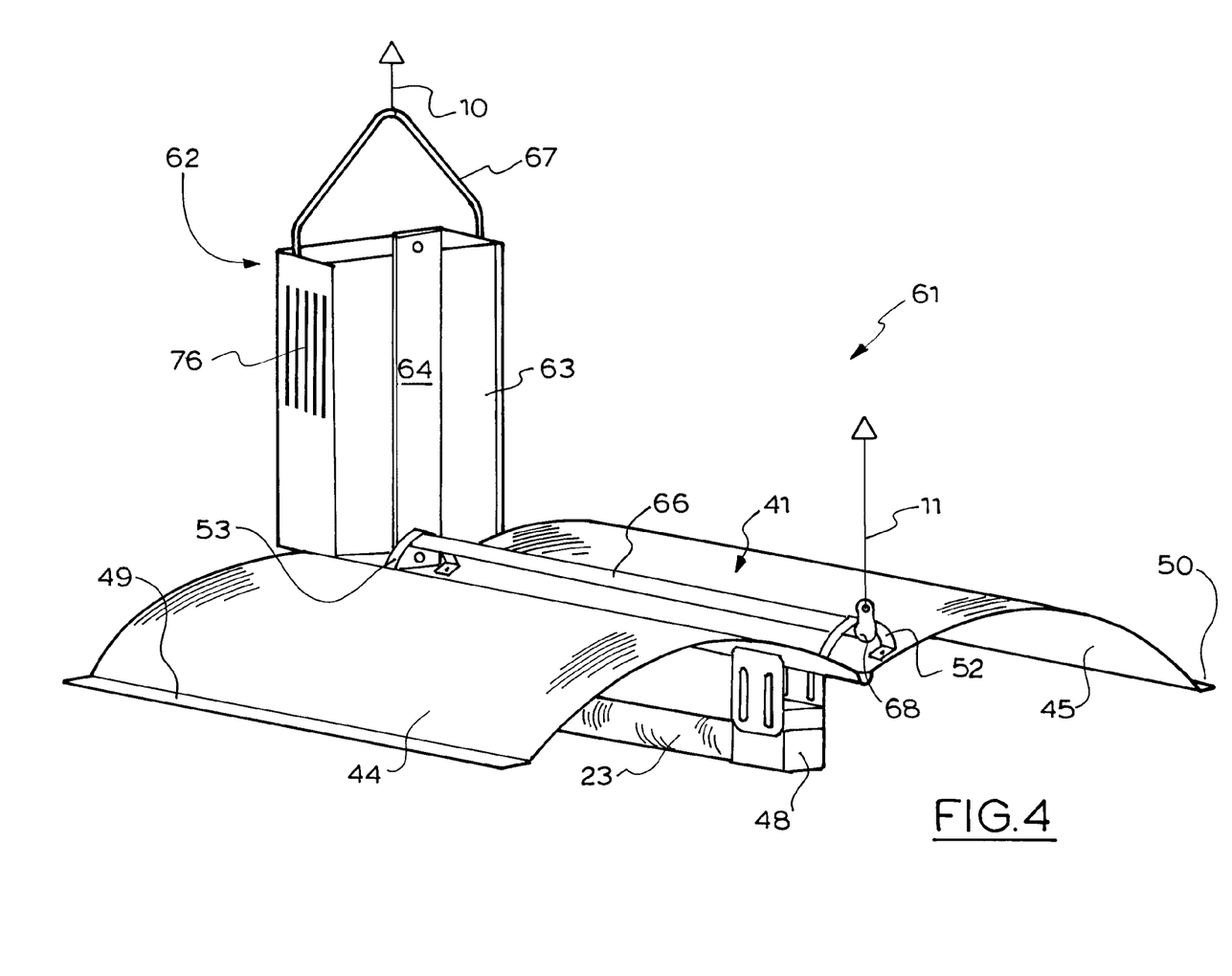
FIG. 4 is a perspective view from above of the close coupled luminaire assembly of a first embodiment.
Figure 5:
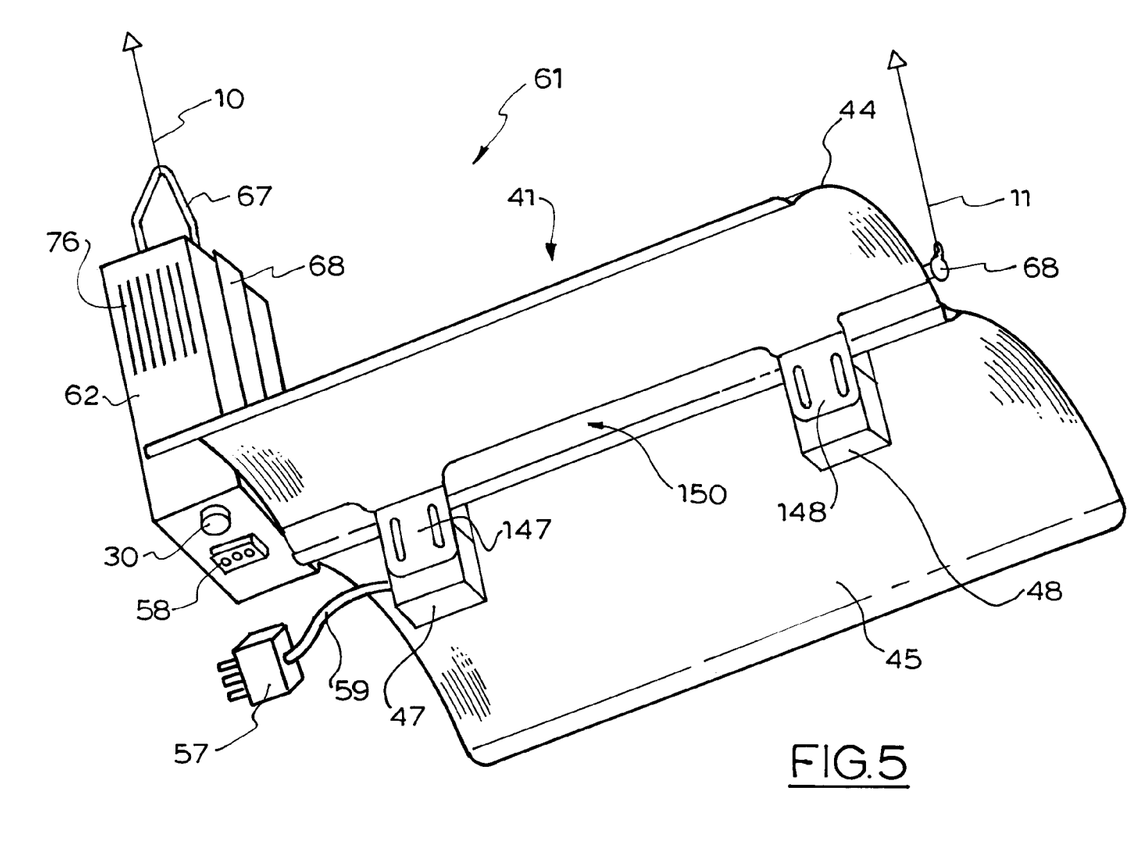
FIG. 5 is a perspective view from below of the close coupled luminaire assembly of FIG. 4, the double ended lamp not being illustrated in FIG. 5.

This difficulty is overcome in accordance with the first embodiment as illustrated in FIGS. 4 and 5 by means of a close coupled luminaire assembly 61 having an electronic ballast 62. The ballast 62 has a housing 63 including heat fins 76, and a hanger 67. The ballast 62 is provided with a mounting mechanism which typically takes the form of mounting feet with apertures extending through the feet. In accordance with the first embodiment, a side plate 64 is provided and which is sized to engage with the mounting feet. That is, the ballast 62 is effectively mounted onto the side plate 64. Ballasts 62 having different rated power capacities will normally be of different sizes, and the side plate 64 will have a size commensurate with the intended ballast 62. For example, a 600 W ballast is approximately 20-25 mm (one inch) shorter than a 1000 W ballast. Furthermore, a large side plate 64 with numerous apertures can mount a range of ballasts of different sizes.

Extending from the side plate 64, and welded thereto, is a reflector support arm 66 having an orificed end plate 68 connected to its distal end. The reflector support arm 66 is passed through both of the U-shaped brackets 52, 53 of the luminaire 41 and the length of the arm 66 substantially corresponds to the spacing between the brackets 52, 53 so that the bracket 53 is adjacent to the side plate 64 and the bracket 52 abuts the end plate 68.

After hanging the luminaire 41 from the arm 66, filaments 11 and 10 are connected to the end plate 68 and the hanger 67 respectively so as to enable the close coupled luminaire assembly 61 to be suspended from an overhead support.

The adjustable focus reflector 43 has a substantially rectangular form when viewed in plan, is formed from sheet metal, and has a V-shaped configuration when viewed in end elevation and in a relaxed state. The reflector 43 is bendable into a tensioned state having a generally M-shaped configuration when viewed in end elevation. A central region of the V and M shapes constitutes the spine 46.

As seen in FIG. 5, the ballast 62 has a female socket 58 and the lamp socket 47 has a short cable 59 extending therefrom and terminating in a male plug 57 which mates with the female socket 58. Thus, the short cable 59 connects the ballast 62 to the lamp 23 (not illustrated in FIG. 5). As a consequence of the short length of the cable 59, the potential for RFI is minimised, if not substantially eliminated. In the embodiment of FIG. 5, the lamp sockets 47, 48 are supported by brackets 147, 148 as before. However, in this embodiment the brackets 147, 148 are fabricated from a single metal strip 150 which has a generally V-shaped configuration and which overlies the spine 46.

Figure 6:
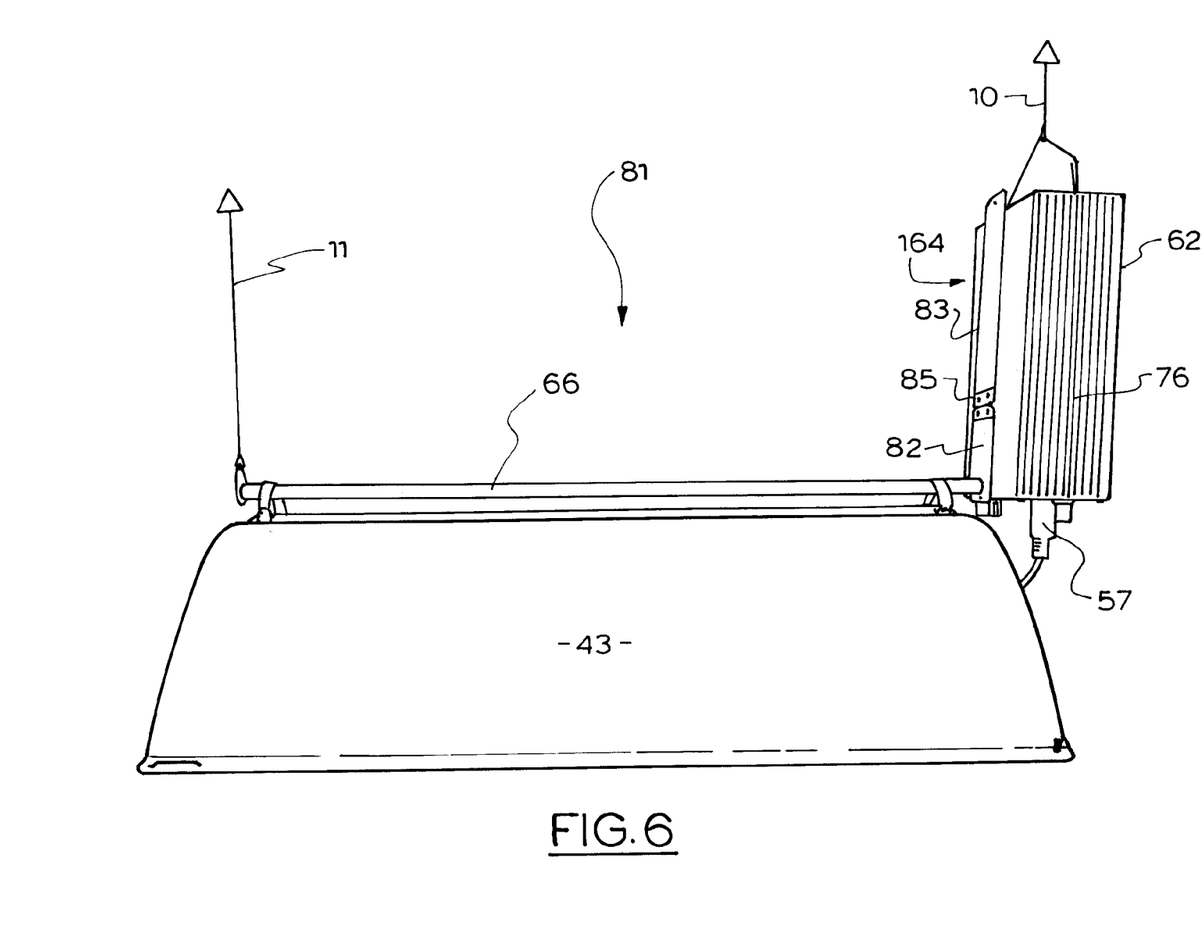
FIG. 6 is a side elevation of a close coupled luminaire assembly of a second embodiment.
Figure 7:
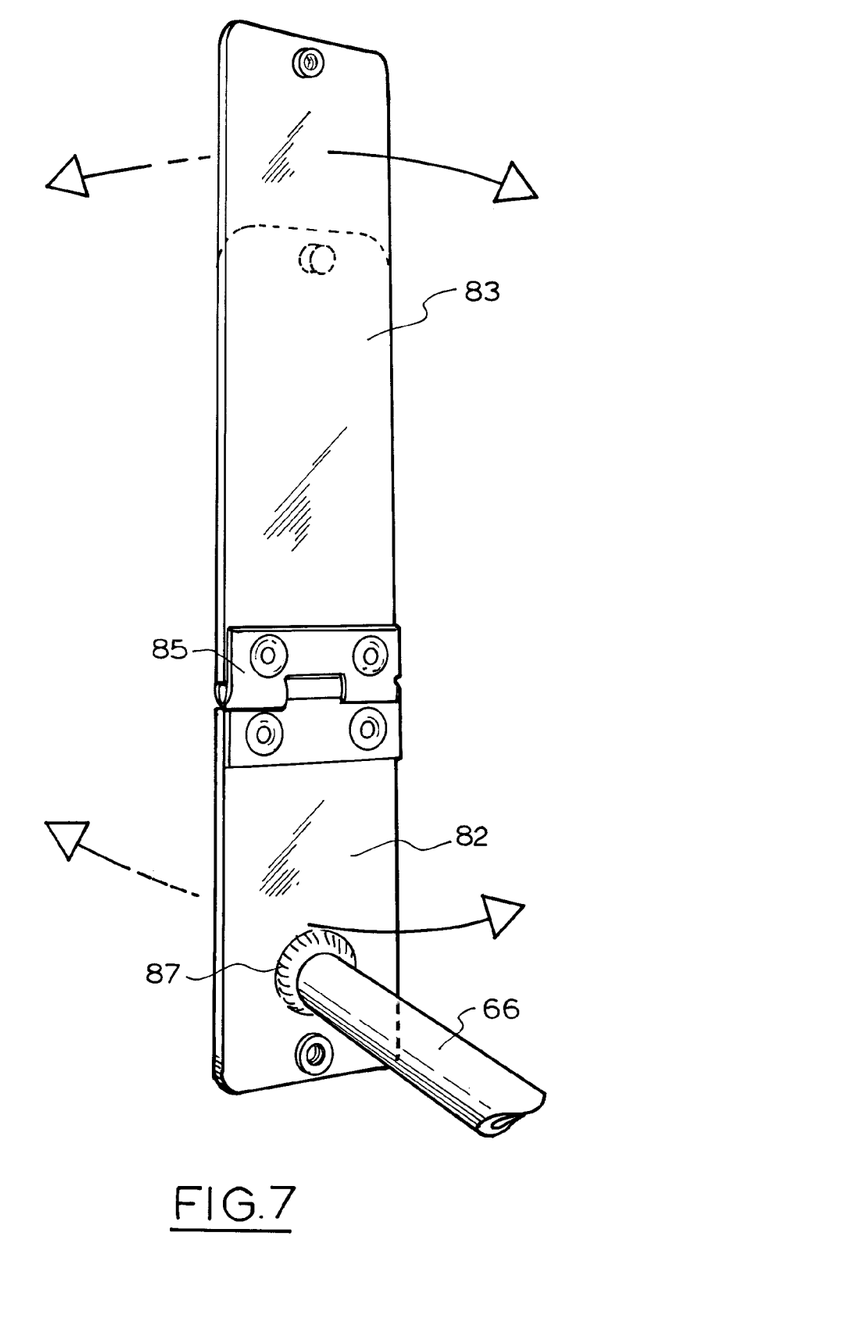
FIG. 7 is a perspective view of the side plate of the embodiment of FIG. 6.

Turning now to FIGS. 6 and 7, in a second embodiment a luminaire assembly 81 is substantially similar to that of the luminaire assembly 61 of the first embodiment. In particular, the electronic ballast 62, the reflector 43 and the reflector support arm 66 are the same. However, the side plate 164 is formed from a base portion 82 and a pivoted portion 83 which is connected to the base portion 82 by means of a hinge 85. The base portion 82 and the pivoted portion 83 can pivot relative to each other as indicated by the arrows in FIG. 7. The base portion 82 is permanently connected to the reflector support arm 66, preferably by means of a weld 87.

The hinged side plate 164 provides two very substantial advantages. The first of these is that the reflector support arm 66 and the folded side plate 164 (not connected with the ballast 62) can fit within the compact packaging used to distribute the luminaire assembly 81 (and excluding the electronic ballast 62).

In addition, by providing pivoted arms 83 of different lengths, as indicated by dotted lines in FIG. 7, mounting arrangements for different electronic ballasts 62 can be accommodated. For example, a shorter pivoted arm 83 is available for use with a 600 W electronic ballast, and a pivoted arm 83 longer by 20-25 mm (one inch) is available for use with a 1000 W electronic ballast.

It will be apparent to those skilled in the art that the above mentioned arrangements provide a number of various substantial advantages. Firstly, the luminaire 41 is essentially unchanged and so the considerable capital investment in tooling up for its construction is able to be utilised to produce both the luminaire 41 which is not close coupled and the close coupled luminaire assemblies 61 and 81.

Furthermore, there is only a very short electrical connection between the ballast 62 and the lamp socket 47 thereby minimising RFI.

In addition, because there is no rigid mechanical interconnection between the ballast 62 and the reflector 43, the sheets 44, 45 can be manipulated so as to change the focus of the close coupled luminaire assembly 61 as explained in European Patent No. 1,488,167.

It will be apparent to those skilled in the art that the luminaires disclosed in WO1996/037732 and WO2003/072998 (which are not close coupled and are intended for use with mains frequency ballasts and single ended lamps) can be converted to close coupled luminaries able to be used with electronic ballasts with low RFI, in accordance with the principles describe above in relation to the illustrated embodiments of FIGS. 4-5 and FIGS. 6 and 7.

Figure 8:
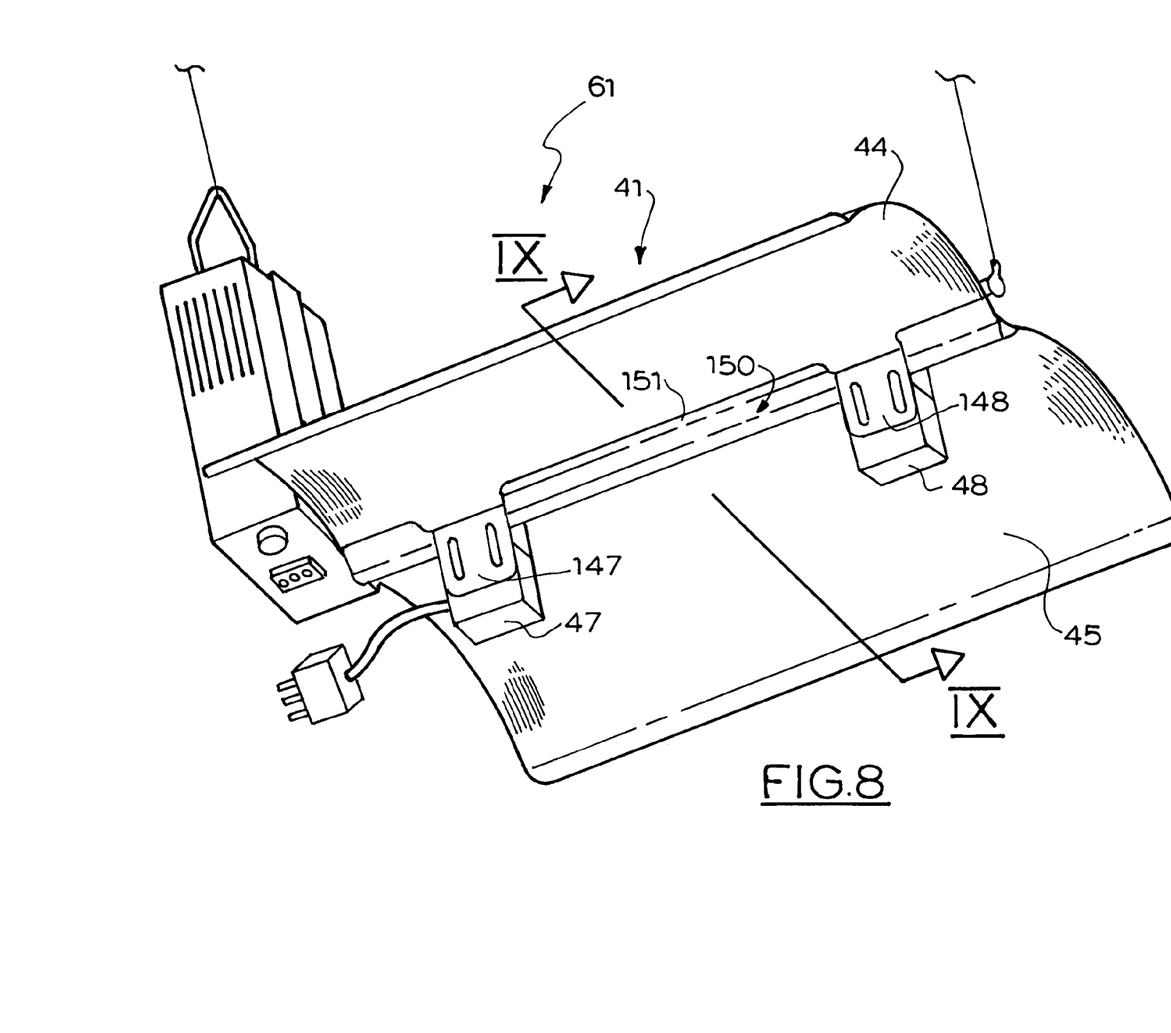
FIG. 8 is a view similar to that of FIG. 5 but of a luminaire of a third embodiment.
Figure 9:
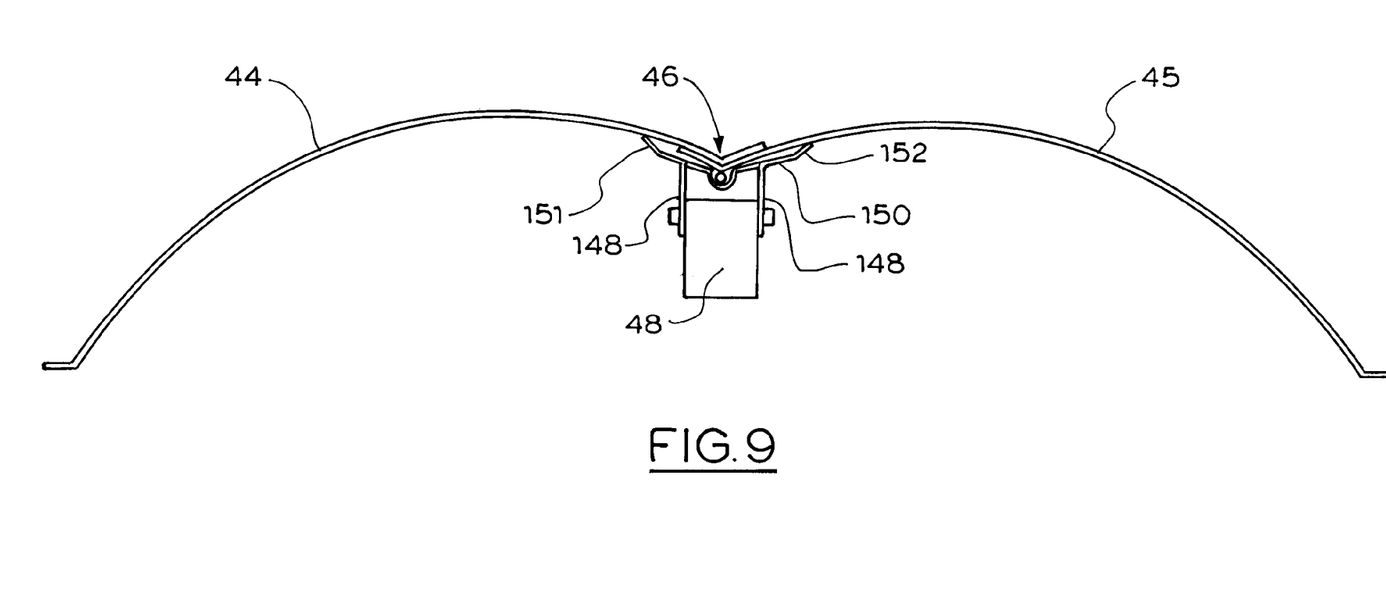
FIG. 9 is a cross sectional view taken along the line IX-IX of FIG. 8.

Turning now to FIGS. 8 and 9, in this embodiment the strip 150 from which the brackets 146, 147 are fabricated, is provided with two narrow, slightly upturned edges 151, 152. The upturned edges 151, 152 are located one to each side of the strip 150 and substantially increase the stiffness of the strip 150. Furthermore, the upturned edges 151, 152 bear against the sheets 44, 45 which make up the reflector 43. As a consequence, the reflector 43 is more stable. Each of the edges 151, 152 is preferably turned up through an angle of approximately 10°. The strip 150 with its upturned edges 151, 152 is equally applicable to the luminaire assembly of FIG. 3

The foregoing describes only three embodiments of the present invention and modifications, obvious to those skilled in the horticultural lighting arts, can be made thereto without departing from the scope of the present invention.

For example, the reflector support arm 66 which is illustrated as being welded to the side plate 64, 164, which is in turn mounted on the ballast 62, can be directly connected to the ballast 62 by various different methods including direct connection with releasable engagement. One such method is to have a short sleeve which protrudes from the ballast 62 and into which the arm 66 can be inserted. The interconnection between the sleeve and the arm 66 can be either a threaded engagement or a bayonet style fitting. Another such method is to have the arm 66 hinged to permit it to pivot through only 90°. In this arrangement in a transport configuration, the arm 66 lies alongside the ballast 62. In the operating position, the arm swings out into the position illustrated in FIG. 4. Either the sleeve arrangement or the hinged arrangement makes for a more compact package for shipping. Still further, the arm 66 can be telescopic, irrespective of its method of connection with the ballast 62.

Similarly, the support arm 66 can also be releasably engaged with, or detachably mounted to, the side plate 64, 164. This releasable engagement can be by means of a threaded sleeve, a bayonet fitting, or the like. Under these circumstances, the hinge 85 is not required. Since almost all ballasts are specifically designed to be mounted to a flat surface of some kind, use of the side plate 64, 164 is particularly convenient. However, it is possible to directly mount the support arm 66 to the ballast 62 without the use of any side plate by modifying, or adding to, the normal mounting arrangements for a ballast.

In addition, although the arm 66 is illustrated as being perpendicular to the longitudinal axis of the ballast 62, it is possible to mount the ballast 62 so that its longitudinal axis is parallel to, or is a prolongation of, the arm 66. This means that the ballast 62 is mounted horizontally, rather than vertically as illustrated. Stated another way, the first axis of the ballast, instead of being a longitudinal axis, is a transverse axis of the ballast.

Although the embodiments described above are described in relation to a variable focus reflector or an adjustable focus reflector, it is not necessary for the reflector to have this property. Reflectors similar to the reflector of the described embodiments but which have a fixed focus are known. An example of such a reflector is that sold under the trade mark EURO REFLECTOR and the present invention is equally applicable to such fixed focus reflectors.

The term "comprising" (and its grammatical variations) as used herein is used in the inclusive sense of "including" or "having" and not in the exclusive sense of "consisting only of".

The invention claimed is:

1. A ballast for a close coupled reflector having a spine, said spine having a length, said ballast comprising a housing with attachment means on said housing to connect a side plate to said housing; a support arm having a distal end and a proximal end, said proximal end of said support arm extending from said side plate and said support arm having a length corresponding to said spine length, and said distal end of said support arm having an orificed endplate.

2. The ballast as claimed in claim 1 wherein said side plate is formed from two portions which are hingedly interconnected.

3. The ballast as claimed in claim 1 wherein said support arm is substantially cylindrical.

4. The ballast as claimed in claim 1 wherein said side plate is larger than said endplate.

5. The ballast as claimed in claim 1 wherein said support arm is permanently connected to said side plate.

6. The ballast as claimed in claim 5 wherein said support arm is welded to said side plate.

7. The ballast as claimed in claim 1 wherein said ballast is an electronic ballast.

8. The ballast as claimed in claim 1 wherein said reflector is substantially rectangular when viewed in plan, is formed from sheet metal, has a V-shaped configuration when viewed in end elevation and in a relaxed state, and is bendable into a tensioned state having a generally M-shaped configuration when viewed in end elevation.

9. The ballast as claimed in claim 8 wherein said spine is formed from a central region of said V and M shapes.

10. The ballast as claimed in claim 1 wherein the length of said support arm is equal to the length of said spine.

11. The ballast as claimed in claim 1 wherein said support arm is substantially perpendicular to said side plate.

* * * * *